United States Patent [19]
Mehra et al.

[11] Patent Number: 5,443,867
[45] Date of Patent: Aug. 22, 1995

[54] ARTICLES INCORPORATING BARRIER RESINS

[75] Inventors: Vinodkumar Mehra; Edmund A. Flexman, Jr., both of Wilmington, Del.

[73] Assignee: E. I. Du Pont de Nemours and Company, Wilmington, Del.

[21] Appl. No.: 142,096

[22] Filed: Oct. 25, 1993

[51] Int. Cl.$^6$ .............................................. B32B 5/02
[52] U.S. Cl. ........................... 428/35.7; 428/36.6; 428/36.91; 428/515; 428/425.3; 428/475.8; 428/476.3; 428/477.4; 428/501; 428/506; 428/524
[58] Field of Search ............... 428/35.7, 36.6, 36.91, 428/515, 425.3, 475.8, 476.3, 477.4, 501, 506, 524

[56] References Cited

U.S. PATENT DOCUMENTS

| | | |
|---|---|---|
| 2,374,576 | 4/1945 | Brubaker . |
| 3,975,463 | 8/1976 | Hirata et al. ............... 260/897 |
| 4,193,907 | 3/1980 | Tacke et al. ............... 260/37 N |
| 4,243,724 | 1/1981 | Strutzel et al. ............... 428/474.7 |
| 4,410,482 | 10/1983 | Subramanian ............... 264/515 |
| 4,416,942 | 11/1983 | DiLuccio ............... 428/332 |
| 4,444,817 | 4/1984 | Subramanian ............... 428/36 |
| 4,457,960 | 7/1984 | Newsome ............... 428/35 |
| 4,611,019 | 9/1986 | Lutzmann et al. ............... 524/169 |
| 4,616,053 | 10/1986 | Schultz et al. ............... 524/171 |
| 4,617,356 | 10/1986 | Hosaka et al. ............... 525/429 |
| 4,628,069 | 12/1986 | Meyer et al. ............... 524/339 |
| 4,724,185 | 2/1988 | Shah ............... 528/339 |
| 4,804,703 | 2/1989 | Subramanian ............... 524/444 |
| 4,950,513 | 8/1990 | Mehra ............... 428/36.7 |
| 4,971,864 | 11/1990 | McCord ............... 428/516 |
| 5,091,478 | 2/1992 | Saltman ............... 525/179 |
| 5,094,806 | 3/1992 | Laughner ............... 264/523 |
| 5,128,401 | 7/1992 | Heinz et al. ............... 524/342 |
| 5,209,958 | 5/1993 | Katsaros et al. ............... 428/36.91 |

FOREIGN PATENT DOCUMENTS

| | | |
|---|---|---|
| 337719 | 10/1989 | European Pat. Off. . |
| 0473032A1 | 3/1992 | European Pat. Off. ...... C08L 77/00 |
| 4345824 | 1/1992 | Japan . |
| 5156036 | 6/1993 | Japan . |
| WO88/06169 | 8/1988 | WIPO ............... C08K 5/13 |
| WO90/07555 | 7/1990 | WIPO ............... C08L 77/00 |

*Primary Examiner*—Charles R. Nold

[57] ABSTRACT

Laminar articles are disclosed comprising a heterogeneous melt of (a) a polyolefin, (b) a barrier resin comprising a blend of a condensation polymer incompatible with the polyolefin such as a polyamide and a phenol-formaldehyde resin, and (c) a compatibilizer. A process for making such laminar articles is also disclosed. Multilayer structures incorporating this barrier resin are also disclosed.

18 Claims, No Drawings

ARTICLES INCORPORATING BARRIER RESINS

BACKGROUND OF THE INVENTION

1. Technical Field

This invention relates to manufacture of articles, especially laminar, shaped articles of a heterogeneous blend of (a) a polyolefin and (b) a barrier resin comprising a blend of two polymers; and to such articles especially in the form of barriers to permeation of fluid, liquid and gaseous materials.

2. Background Art

U.S. Pat. No. 4,410,482 discloses a process for manufacturing a laminar, shaped article of polymeric material comprising the steps of establishing a melted, heterogeneous, blend of a polyolefin, a condensation polymer such as a polyamide, and a compatibilizer; and forming the melted blend by stretching a body of the melt and cooling the stretched body to below the melting point of the lowest melting polymer component. Such laminar articles are useful as containers for liquid hydrocarbons, including fuel tanks for motor vehicles.

U.S. Pat. No. 4,410,482 also discloses laminar shaped articles based on such blend wherein the polyolefin and the polyamide are present in the article as a multitude of thin, substantially two-dimensional, parallel and overlapping layers of material. The barrier properties of such articles are good but not sufficient to satisfy current commercial and regulatory requirements for barriers to permeation of fluid, liquid and/or gaseous materials. An article is therefore needed which provides improved barrier properties while maintaining the advantages of prior art articles.

SUMMARY OF THE INVENTION

According to this invention there is provided a laminar, shaped article comprising a combination of (a) the polyolefin, (b) a barrier resin comprising a blend of the condensation polymer and the phenol-formaldehyde resin wherein the barrier resin is present in the article as a multitude of thin, substantially two-dimensional, parallel and overlapping layers in the polyolefin, and (c) a compatibilizer which is believed to adhere the layers together.

There is also provided a process for manufacturing a laminar, shaped article of polymeric material comprising the steps of establishing a melted, heterogeneous, blend of (a) a polyolefin, (b) a barrier resin comprising a blend of a condensation polymer incompatible with the polyolefin and a phenol-formaldehyde resin, and (c) a compatibilizer; and forming the melted blend by stretching a body of the melt and cooling the stretched body to below the melting point of the lowest melting polymer component.

A further embodiment of the present invention comprises laminates of a first layer of the material having a laminar structure derived from a polyolefin, a barrier resin comprising a blend of a condensation polymer incompatible with the polyolefin and a phenol-formaldehyde resin and a compatibilizer; and a second layer of a polyolefin comprising 10 to 90 percent of the total thickness of the laminate, said layers being melt bonded together. Preferably the polyolefin in the second layer is the same as that in the first layer. Another embodiment is a laminate of a first layer of polyolefin, a second layer of a compatibilizer and a third layer of a barrier resin.

DESCRIPTION OF THE INVENTION

Films, filaments, sheets, containers, tubing, and other shaped articles have long been made from polymeric compositions. Special qualities desired for shaped articles have required special polymers or specially formulated polymeric compositions. This invention utilizes a special process and a special formulation of polymers to yield a composition which exhibits improved barrier to fluid permeation while maintaining good mechanical properties.

The general product of this invention is a laminar shaped article made from a mixture of (a) a polyolefin, (b) a barrier resin comprising a blend of at least two polymers, and (c) at least one polymer which serves to adhere together laminar domains of the incompatible polymers. The product is preferably made by mixing together particles of the polymers, heating the mixture to yield a heterogeneous melt of material, and stretching the melt to yield an elongated discontinuous polymer phase. The composition of the present invention is a heterogeneous melt-blended composition. This heterogeneous structural composition is present in articles made of melt blended composition. By heterogeneous it is meant that there are regions, domains, particles or platelets, these words being used interchangeably, of barrier material, such as polyamide in a matrix of polyolefin.

Component (a), the polyolefins used in the composition of the invention, include polyethylene, polypropylene, polybutylene, copolymers of those materials, and the like. Polyethylene is preferred and may be high, medium or low density.

Component (b), the barrier resin, is a blend of a phenol-formaldehyde resin and a condensation polymer which is incompatible with the polyolefin. For the purposes of this invention, "incompatible polymers" means polymeric materials which have substantially no mutual miscibility in the melt form. The condensation polymer, incompatible with the polyolefin, includes polyamides, polyethylene terephthalate and polycarbonates. The barrier resin may also incorporate other materials, such as polyvinyl alcohol, or related copolymers thereof.

Polyamides and copolyamides are well known and are made by reacting carboxylic acids with primary amines under well-known conditions. Examples of carboxylic acids used in carboxylic acids used in polyamide preparation are adipic acid, suberic acid, sebacic acid, azelaic acid, malonic acid, glutaric acid, pimelic acid, and the like. Examples of primary amines are tetramethylene diamine, pentamethylene diamine, hexamethylene diamine, octamethylene diamine, and the like. Exemplary polyamides include polypentamethylene adipamide, polyhexamethylene adipamide, polyhexamethylene sebacamide, polyamides obtained from lactams such as caprolactams and from amino acids such as 11-aminoudecanoic acid, and the like. Polycaproamide and a copolyamide of adipic acid, hexamethylene diamine and caprolactum are preferred.

The barrier resin also contains a phenol-formaldehyde resin. The phenol-formaldehyde resins preferred in the present invention are often referred to as "novolacs" and are produced when a less-than-stochiometric amount of formaldehyde is reacted with a phenol to form a solid product that cannot cross-link without additional formaldehyde or other added chemical reagents. The resins so formed are thermoplastic polyphenols.

The phenol-formaldehyde resins preferred in the present invention can be represented by the general formula:

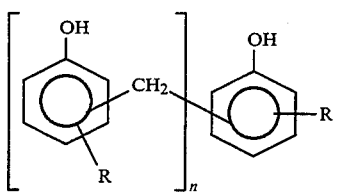

wherein n can be an integer from 1 to 1000, and R can be hydrogen, a halogen (e.g., bromine, chlorine, fluorine, etc.); a $C_1$–$C_{16}$ alkyl, a $C_6$–$C_{18}$ aryl or a $C_7$–$C_{20}$ arylalkyl radical, any of which may be substituted with a $C_1$–$C_{12}$ alkyl group or a halogen atom; or a hydroxy aryl or alkyl hydroxy aryl radical, or mixtures thereof. These phenol-formaldehyde resins are not limiting and other may be useful in the present invention. These phenol-formaldehyde resins may be synthesized by methods known in the art. Examples of the phenol-formaldehyde resins useful herein include, but are not limited to, phenol-formaldehyde; cresol formaldehyde; resorcinol-formaldehyde; butyl phenol-formaldehyde; ethyl-phenol-formaldehyde; hexyl phenol-formaldehyde; propyl phenol-formaldehyde; pentyl-phenol-formaldehyde; octyl-phenol-formaldehyde; heptyl phenol-formaldehyde; nonyl-phenol-formaldehyde; bisphenol-A-formaldehyde; hydroxynaphthalene formaldehyde and combinations thereof. It is understood that the above substituted phenols include their ortha-, metal-, and para-isomers. The various listed phenol-formaldehyde resins above differ in their R substituents, melting or softening points, viscosities, and other properties. Phenol-aldehydes, other than formaldehydes, are also useful in the present invention.

The most preferred phenol-formaldehyde resins useful in the present invention include phenol-formaldehyde, cresol formaldehyde, resorcinol-formaldehyde, butyl phenol-formaldehyde.

Component (c), the compatibilizer may be any number of compatibilizers which are known in the art. By compatibilizer it is meant that the polyolefin and the barrier resin may be blended to form an integral structure without significant delaminations, voids, or other structural defects which may adversely affect the physical properties and barrier properties. The compatibilizer is believed to promote interpolymer or interfacial bonding between the polyolefin and the barrier resin. Typically, condensation polymers and polyolefins are considered to be incompatible polymers. In some cases, the compatibilizer may contribute to improved barrier properties and/or improved mechanical properties. In absence of the compatibilizer, the polymer layers making up the laminar article do not adhere to one another and the article may not have useful mechanical properties.

The preferred compatibilizer is an alkyl-carboxyl substituted polyolefin, which is described in U.S. Pat. No. 4,950,513. The alkyl-carboxyl substituted polyolefin compatibilizer is a polyolefin which has carboxylic moieties attached thereto, either on the polyolefin backbone itself or on side chains. By "carboxylic moiety" is meant acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Such compatibilizers can be prepared by direct synthesis or by grafting. An example of direct synthesis is the polymerization of an α-olefin with an olefinic monomer having a carboxylic moiety; and an example of grafting is the addition of a monomer having a carboxylic moiety to a polyolefin backbone. In the compatibilizer made by grafting, the polyolefin is polyethylene or a copolymer of ethylene and at least one α-olefin of 3–8 carbon atoms such as propylene, and the like, or a copolymer including at least one α-olefin of 3–8 carbon atoms and a diolefin, such as 1,4-hexadiene, and the like. The polymer may also be a terpolymer. The polyolefin is reacted with an unsaturated carboxylic acid, anhydride, or ester monomer to obtain the grafted polymer. Representative eligible acids, anhydrides, and esters include: methacrylic acid; acrylic acid ethacrylic acid; glycidyl methacrylate; 2-hydroxyethylacrylate; 2-hydroxy ethyl methacrylate; diethyl maeleate; monoethyl maleate; di-n-butyl maleate; maleic anhydride; maleic acid; fumaric acid; itaconic acid; monoesters of such dicarboxylic acids; dodecenyl succinic anhydride; 5-norbornene-2,3-anhydride; nadic anhydride (3,6-endomethylene-1,2,3,5-tetrahydrophthalic anhydride); and the like. Generally, the graft polymer will have from about 0.01 to about 20, preferably about 0.1 to about 10, and most preferably about 0.2 to about 5, weight percent graft monomer. Grafted polymers are described in greater detail in U.S. Pat. Nos. 4,026,967 and 3,953,655.

In the compatibilizer made by direct synthesis, the polymeric material is a copolymer of an α-olefin of 2–10 carbon atoms and an α,β-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

An ionomeric compatibilizer is preferably made from directly synthesized compatibilizer and is preferably made up of about 90 to 99 mole percent olefin and about 1 to 10 mole percent α,β-ethylenically unsaturated monomer having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative eligible α-olefins and unsaturated carboxylic acid, anhydride, and ester monomers are those previously herein described. Ionomeric polymers are described in greater detail in U.S. Pat. No. 3,264,272.

The alkyl-carboxyl substituted polyolefin compatibilizer preferably is a copolymer of ethylene and an α,β-ethylenically unsaturated carboxylic acid.

Illustrative of the α,β-ethylenically unsaturated carboxylic acids useful in the preparation of said copolymer are acrylic acid, methacrylic acid, ethacrylic acid, itaconic acid, maleic acid, fumaric acid, and monoesters of itaconic acid, maleic acid, and fumaric acid. To the extent that a metallic ion is used to neutralize the acid groups of the carboxylic acid it is preferred that the metal be zinc, although useful results can be obtained using other metal cations such as sodium, potassium, lithium, magnesium, aluminum, and strontium in place of zinc. Procedures for preparing these copolymers are described in U.S. Pat. No. 3,264,272. An especially useful composition is an ionomer made up of metal ion partially neutralized ethylenemethacrylic acid copolymers.

As noted above, the compatibilizer, component (c), may also be a graft polymer with a polyolefin backbone onto which cyclic anhydride moieties, derived from maleic anhydride, for example have been grafted. These compatibilizers are described in U.S. Pat. No. 4,971,864 and can be prepared by procedures such as those described in U.S. Pat. Nos. 4,026,967 and 4,612,155.

The process for making laminar articles comprises the steps of establishing a melted, heterogeneous, blend of (a) a polyolefin, (b) a barrier resin comprising a blend of a condensation polymer incompatible with the polyolefin, such as a polyamide, and a phenol formaldehyde resin, and (c) a compatibilizer; and forming the melted blend by stretching a body of the melt and cooling the stretched body to below the melting point of the lowest melting polymer component.

In one embodiment, the polymer particles, in unmelted form, are mixed thoroughly so as to provide a substantially homogeneous distribution, and care must be exercised to avoid substantial additional mixing after the polymers have been heated to a melt. In another embodiment, the polymer particles can be combined in softened or molten form so long as the combination of polymers maintains a substantially heterogeneous character. The blend can also be established by combining the polymers at a temperature such that one of the polyolefin or the condensation polymer is not softened or molten and then heating the combination. The success of the invention generally depends on establishing a melted heterogeneous blend of incompatible polymers so that when the melt is stretched, such as by extrusion forces, one polymer is in the form of a continuous matrix phase and another polymer is in the form of a discontinuous, multitude of thin, substantially two-dimensional, parallel and overlapping layers embedded in the continuous phase.

Component (c) is the polymer which adheres together adjacent layers or domains of the incompatible polymers. In view of its believed purpose, that polymer can be termed a compatibilizer; but the actual mechanism of its operation is not completely understood. It is believed that at least some of the compatibilizer is concentrated in the laminar, shaped article of this invention between the adjacent layers of incompatible polymer joined partially with one layer and partially with an adjacent layer, thus adhering the layers together. Without the compatibilizer, shaped articles formed from heterogeneous melts of incompatible polymer may have poor mechanical properties and generally cannot even be extruded or molded to yield unitary articles.

Although it is not required, it is preferred that the barrier resin used in practice of this invention is, as stated, in particulate form; and it is desired that both the polyolefin and the barrier resin should be mixed as particles. The particles should, as a general rule, be of a size such that the molten blend of incompatible polymers when introduced to some melt stretching means, such as extrusion die lips, exhibits the heterogeneity necessary for practice of the invention. When the particles, especially particles of the barrier resin, are too small a size, the melted blend, even though not excessively mixed, tends to function as a homogeneous composition because the domains of material making up the discontinuous polymer phase are so small. When the particles, especially particles of the barrier resin, are of too large a size, the melted blend tends to form into shaped articles having a marbleized structure rather than a laminar structure; the large domains of the materials which would make up the discontinuous phase extending to opposite boundaries of the shaped articles and causing disruption of the material which would make up the continuous phase. The particles are preferably generally regular in shape, such as cubical or spherical or the like. The particles may, however, be irregular; and they may have one dimension substantially greater than another dimension such as would be the case, for example, when flakes of material are used.

The condensation polymer and the phenol-formaldehyde resin may be blended by any convenient method, such as melt blending or by polymerizing one in the presence of the other.

When the polyolefin and the barrier resin are present as individual particles, the particles are preferably of approximately the same size although such is not required. The compatibilizer can be provided by itself as individual particles or it can be mixed into, coated onto, or otherwise combined with the barrier; resin or the polyolefin.

The thickness of the layers of material in the discontinuous phase is a function of the particle size combined with the degree of stretching in the forming step. The particle size of the polymer which will be the discontinuous phase is generally selected with a view toward resulting, after stretching, in overlapping layers which can be from about 0.5 to 50 micrometers thick and perhaps, sometimes slightly thicker.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand, in which case the mixing being that any two samplings of the mixture in a given mass of material should preferably yield substantially the same composition. The mixing of the polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the polymers are heated to a temperature greater than the melting point of the highest melting polymer component. It is noted that the heating is conducted for the purpose of stretching the softened or melted blend. In the case of a polymer which exhibits no well-defined melting temperature, "melting temperature" as used here refers to a temperature at least high enough that the polymers have been softened to the degree required to stretch each of the polymers in the blend. That heating results in a softened or melted, heterogeneous blend of materials and the heating must be conducted in a manner which avoids substantial additional mixing of the incompatible polymers because such mixing could cause a homogenization and combination of the melted particles and could result in a melt and a shaped article of homogeneous, unlayered, composition. The heating can be conducted by any of several well-known means and is usually conducted in an extruder. It has been learned that a single-screw extruder of the type which is designed for material transport and not material mixing can be used between the heating and forming steps of this invention without causing homogenization of the two-phase incompatible polymer composition. Low shear and low mixing extruders of the kind normally used for polyvinyl chloride, acrylonitrile, or polyvinylidene chloride can be used to practice this invention if they are used in a way to melt and transport the materials and minimize mixing of the components. High shear and high mixing extruders of the kind normally used for nylon and polyethylene cannot generally be used to practice this invention. To the extent that the composition retains an aspect of heterogeneity, the process and the product of this invention can be realized.

The forming step requires stretching of the melted blend followed by cooling. Stretching is an elongation of the two-phase melt to cause a substantial change in the dimensions of the particles in the discontinuous phase. Stretching can be accomplished by any of several means, or by a combination of more than one such means. For example, the melt can be stretched by being squeezed between rollers or pressed between platens or extruded between die lips. Molding processes such as blow molding also cause stretching in accordance with this process. In the manufacture of containers as shaped articles, the stretching can be accomplished by a combination of extruding a blend of the heterogeneous melt to yield a container preform or parison followed by blow molding the parison into a finished container.

The stretching can be in one direction or in perpendicular directions. Whether the stretching is conducted in one direction or two, there should preferably be an elongation of from 100 to 500 percent in at least one direction; and an elongation of from 100 to 300 percent is more preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for practicing the invention, the barrier resin which is to be a discontinuous phase in the shaped articles should be present in generally less than about 40 weight percent of the mixture. It has been found that the barrier resin should be present in more than about 2 weight percent and less than about 40 weight percent of the mixture and about 2 to 15 weight percent is preferred. The barrier resin should be 60–95 weight percent condensation polymer and 5–40 weight percent phenol-formaldehyde resin, and about 10–40 weight percent of the phenol-formaldehyde resin is preferred. The polyolefin should be present in more than about 60 weight percent and less than about 97 weight percent of the mixture and 80 to 96 weight percent is preferred. The compatibilizer should be present in about 0.25 to 12 weight percent of the and about 2 to 6 weight percent is preferred. Any of the components can be used with or to introduce inert fillers into the composition provided only that the fillers are not of a kind or in an amount which would interfere with formation of the layered construction or with the desired or required properties of the composition. Amounts of opacifiers, colorants, antioxidants, antistatic agents, brighteners, plasticizers, tougheners, flame retardants, reinforcing agents, lubricants, stabilizers and the like which are ordinarily used in structural polymeric materials can be used herein. Preferably such fillers or additives do not adversely affect the physical properties or the heterogeneous nature of the composition in the formed article. The amount of such filler is not included in the calculation of amounts of the polyolefin, barrier resin and compatibilizer.

A further embodiment comprises laminates of the articles having the laminar structure described hereinbefore with one or two layers of homogeneous polyolefin melt bonded thereto. Examples of such laminates include a laminated film, the first layer of which comprises the laminar-structured material obtained by stretching a melt described herein of the polyolefin, barrier resin and compatibilizer bonded to a second layer of pure polyolefin, and a blow molded container having a outer laminar-structured barrier layer obtained from the melt of polyolefin, barrier resin, and compatibilizer bonded to an inner layer of polyolefin. The polyolefin which forms the second layer is preferably the same polyolefin used as component (a) in the laminar blend. Under these conditions the layers can be bonded together without the use of an adhesive layer. The preparation of similar laminates which differ in the polymer used to form the discontinuous overlapping barrier layers is described in U.S. Pat. No. 4,416,942.

In another embodiment of the invention, laminated structures can be prepared by coextruding a layer of the heterogenous mixture described above with at least one second layer of polyolefin. The heterogenous mixture is formed in a first extruder as described hereinbefore, while concurrently, the polyolefin is melt extruded through a second extruder suitable for polyolefins. As the two components are melted in their respective extruders, they are transported from a feed block or combining adaptor into a die where the two components, as coextruded layers, exit the die slot. The combining adpator is adjusted so that the polyolefin layer comprises 10 to 90 percent, more preferably 50 to 90 percent, of the thickness of the laminate. Containers such as bottles can be produced by coextruding the two or more layers to form a multiple layered parison which can be inflated in a suitable mold to form the desired article.

A further embodiment of the present invention is a multilayer laminate comprising at least three layers, wherein the first layer comprises a polyolefin. Other components may be added to the polyolefin layer. The second layer comprises a compatibilizing layer, which provides adhesion between the first and third layers. The third layer comprises the barrier resin described herein; ie. a blend of a condensation polymer and phenolformaldehyde resin. The barrier resin is in the form of an independent layer or film rather than being present as a multitude of platelets or thin, parallel, overlapping layers in a matrix of polyolefin. Various additives may be added to the barrier resin composition in order to allow it to retain its flexibility. The laminates of this invention can be prepared by coextruding a layer of the polyolefin with at least one second layer of the barrier resin composition. The polyolefin is formed in a first extruder while concurrently the compatibilizer is melt extruded through a second extruder, and the barrier resin composition is melt extruded through a third extruder. As the three components are melted in their respective extruders, they are transported from a feed block or combining adaptor into a die where the three components, as coextruded layers, exit the die slot. The combining adaptor may be adjusted so that the barrier layer preferably comprises 2-20%, the compatibilizer preferably comprises 1-15 % and polyolefin composition layer preferably comprises 70 to 95 percent of the thickness of the article. Containers such as bottles can be produced by coextruding the two or more layers to form a multiple layered parison which can be inflated in a suitable mold to form the desired article. The polyolefin layer and the barrier resin layer may require an adhesive tie layer.

These laminates exhibit improved fluid barrier properties and the impact properties of blow molded tanks and drum are improved because the majority of the wall thickness consists of homogeneous polyolefin such as homogeneous polyethylene.

The blends and laminates of the present invention may be used as containers for hydrocarbon and oxygen-containing liquids, and also may be used to form sheets, films, tubes, pipes, and the like. A particularly contemplated use is for fuel tanks for motor vehicles.

The novalacs used herein are characterized by the $T_g$ as determined by Differential Scanning Calorimetry at 10° C. per minute, and molecular number average (Mn) and molecular weight average (Mw) as determined by Gel Permarion Chromatography (GPC) in tetrahydrafuran (THF) at 30° C.

EXAMPLES

Comparative Examples 1, 2 and 3

Blends were made from particles of polyolefin, nylon and compatibilizer which were mixed in a polyethylene bag prior to processing. The nylon used was copolyamide prepared by condensing hexamethenediamine, adipic acid and caprolactam to give a composition containing about 80 weight percentage polyhexamethylene adipamide and 20 weight percentage polycaproamide. For comparative example 3, a lower melting copolyamide with about 65 weight polyhexamethylene adipamide and 35 weight percent polycaproamide was used.

The polyethylene used was linear polyethylene having a density of 0.945 gram/cubic centimeter, a melt index of 6 grams/10 minutes as determined by ASTM D-1238 (Condition F).

The compatibilizer was obtained by melt grafting fumaric acid onto polyethylene having of 0.957 gm/cubic centimeter and melt index of about 1, as determined by ASTM D-1238. The fumaric acid was grafted onto polyethylene in an amount of about 0.9 weight percent based on total weight of polymer in accordance to the teachings of U.S. Pat. No. 4,026,967.

The following compositions were used:

Comparative Example 1

Copolyamide 3.2 wt. %, compatibilizer 3.8 wt. % and polyethylene 93 wt. %. The mixture was fed to Rocheleau-model 7A continuous extrusion blow molding machine equipped with a 2:1 compression ratio screw (Diam. 38.1 mm) without mixing tip. Bottles with a capacity of approximately 1000 ml were blow molded at an extrusion temperature of about 230° C. The bottles weighed approximately 65 grams. The sidewalls were about 1.25 mm thick, and showed laminar distribution of the barrier resin, the copolyamide.

Comparative Example 2

Copolyamide 2.6 wt. %, compatibilizer 3.8 wt. % and polyethylene 93.6 wt. % were used to make bottles as per the process described in comparative example 1.

Comparative Example 3

For this example, lower melting copolyamide was used and bottles were made from copolyamide 3.2 wt. %, compatibilizer 3.8 wt. % and polyethylene 93 wt. % and bottles were made as per comparative example 1 at a melt temperature of 220° C.

The barrier effectiveness was determined by filling the test bottles with 15% by volume methanol/xylene and xylene at 40° C. and determining the weight loss over a period of several days. For each test, triplicates were run. The bottles were weighed periodically and their weight loss plotted against time and average steady state weight loss was determined for each run. Based on known weight of container and its geometry, the surface area and average thickness were calculated (ASTM-2684). The permeability values were calculated and the results are summarized below:

| Comp. Example | Permeability (g.mm/day.sq. meter) | |
| --- | --- | --- |
| | 15% Methanol/Xylene | Xylene |
| 1 | 35.4 | 3.9 |
| 2 | 40.1 | 5.9 |
| 3 | 41.3 | 4.3 |

Example 1

The barrier resins were made by blending a novolac resin with the copolyamide of comparative example 1 in twin screw extruders at melt temperature of approximately 260°-290° C. The bottles were made by the procedure described in comparative example 1. The weight percents of the copolyamide and the novalac resin are reported below. The novalac is a phenol-based resin with a $T_g$ of 63° C., determined by Differential Scanning Calorimetry (DSC) at 10° C. per minute, having a Mn of 1500 and a Mw of 9000 determined by GPC in THF at 30° C. The relative amounts of compatibilizer and polyethylene to copolyamide were same as comparative example 1. The permeation results are summarized below:

| % Copolyamide | % novolac | Permeability (g.mm/day.sq. meter) | |
| --- | --- | --- | --- |
| | | 15% Methanol/Xylene | Xylene |
| 3.2 | 0.4 | 25.9 | 2.8 |
| 3.2 | 0.8 | 24.8 | 2.0 |
| 3.2 | 1.4 | 24.0 | 0.8 |

Thus, a significant improvement in barrier properties is demonstrated for the bottles made from a barrier resin of polyamide and novolac blends for both hydrocarbon and hydrocarbon/methanol fuel blends.

Example 2

The barrier resins were made by blending novolac resins with copolyamide of comparative example 2 in twin screw extruders at melt temperature of approximately 260°–290° C. The bottles were made per the process described in comparative example 1. The weight percents of the copolyamide and the novalac resin are reported below. The novalac resins are based on m-cresol with a $T_g$ of 113° C., a Mn of 2100 and a Mw of 22,000; and based, on phenol with a $T_g$ of 76° C., a Mn of 1300 and a Mw of 17,000. The relative amounts of compatibilizer and polyethylene to copolyamide were same as comparative example 2. The permeation results are summarized below:

| % Copoly-amide | % novolac | novolac Used | Permeability (g.mm/day.sq. meter) 15% Methanol/Xylene | Xylene |
|---|---|---|---|---|
| 2.6 | 0.6 | m-cresol form | 29.1 | 2.8 |
| 2.6 | 0.6 | phenol-form | 20.4 | 0.8 |

Thus, a significant improvement is demonstrated in barrier properties of the bottles made from barrier resins of polyamide and novolac blends for both hydrocarbon and hydrocarbon/methanol fuel blends.

Example 3

The barrier resins were made by blending novolac resins with copolyamide of comparative example 3 in twin screw extruders at melt temperature of approximately 260°–290° C. The bottles were made per the process described in comparative example 3. The weight percents of the copolyamide and the novalac resin are reported below. The novalac is the phenol-based resin described in Example 2. The relative amounts of compatibilizer and polyethylene to copolyamide were same as comparative example 3. The permeation results are summarized below:

| % Copolyamide | % novolac | Permeability (g.mm/day.sq. meter) 15% Methanol/Xylene | Xylene |
|---|---|---|---|
| 3.2 | 0.8 | 27.5 | 0.4 |

Thus, a significant improvement is demonstrated in barrier properties of the bottles made from barrier resins of polyamide and novolac blends for both hydrocarbon and hydrocarbon/methanol fuel blends.

Comparative Example 4

For this example, 5-layer coextruded bottles of about one liter capacity were made on a Bekum coextrusion machine with high density polyethylene and copolyamide of comparative example 1. The high density polyethylene ("PE") used was linear polyethylene having a density of 0.950 and melt index of approximately 10 grams/10 minutes as determined by ASTM-1238 (Condition F). The adhesive used was BYNEL® E409 (commercially available from E. I. du Pont de Nemours and Company). The 5-layer structure was high density polyethylene/adhesive/copolyamide/adhesive/high density polyethylene. The barrier properties were determined as per the procedure described in comparative example 1.

Example 4

For this example the bottles were made in the same way as comparative example 4 except that the copolyamide layer was replaced with the copolyamide/novolac layer. The copolyamide/novolac was made by melt blending copolyamide of comparative example 1 and 20% phenol based novolac described in example 2.

The permeability of the barrier layers in comparative example 4 and example 4 was calculated from the observed overall permeability of the bottles by using the following relationship:

$$1/P_C = 1/T\{T_1/P_1 + T_B/P_B\}$$

Where
 $P_C$ = permeability of the bottle
 $P_1$ = permeability of high density polyethylene and adhesive (49.1 g.mm/day.sq.m)
 $P_B$ = permeability of the barrier layer
 T = total thickness
 $T_1$ = total thickness of high density polyethylene+adhesive
 $T_B$ = total thickness of barrier layer The permeability of bottles was determined as per the procedure described in comparative example 1. The results are summarized below:

|  | Permeability (g.mm/day.sq. m.) Observed Bottle Values | | Permeability (g.mm/day.sq. m.) Calculated, Barrier Layer | |
|---|---|---|---|---|
|  | Xylene | 15% Methanol/Xylene | Xylene | 15% Methanol/Xylene |
| Comparative example 4 (barrier thickness = 0.094 mm; PE + adhesive thickness = 1.4 mm) | 0.17 | 42.4 | 0.011 | 14.2 |
| Example 4 (Barrier thickness = 0.038 mm; PE + adhesive thickness = 1.2 mm) | 0.21 | 35.8 | 0.0067 | 3.9 |

Thus, there is an improvement in barrier properties of the polyamide/novolac blend layer for both hydrocarbon and hydrocarbon/methanol fuel blends.

We claim:

1. A laminar, shaped article comprising a blend of (a) polyolefin, (b) a barrier resin comprising a blend of a condensation polymer incompatible with the polyolefin and a phenol-formaldehyde resin, wherein the polyolefin is present in the article as a continuous polyolefin matrix phase and the barrier resin is present in the article as a discontinuous distributed phase in the form of a multitude of thin, substantially two-dimensional, parallel and overlapping layers of material embedded in the continuous polyolefin, and (c) a compatibilizer.

2. The article of claim 1 wherein the polyolefin is selected from polyethylenes, polypropylenes, polybutylenes, or copolymers or mixtures of those materials.

3. The article of claim 1 wherein the condensation polymer is selected from polyamides or polyesters.

4. The article of claim 1 wherein the phenol-formaldehyde resin is represented by the following general formula:

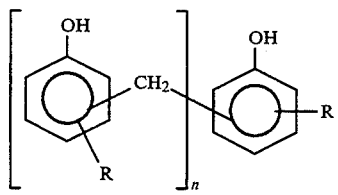

wherein n can be an integer from 1 to 1000, and R can be hydrogen, a halogen, a $C_1$–$C_{16}$ alkyl, a $C_6$–$C_{18}$ aryl or a $C_7$–$C_{20}$ arylalkyl radical, any of which may be substituted with a $C_1$–$C_{12}$ alkyl group or a halogen atom; or a hydroxy aryl or alkyl hydroxy aryl radical.

5. The article of claim 1 wherein the phenol-formaldehyde resin is based on phenol.

6. The article of claim 1 wherein the barrier resin is a discontinuous phase and is present in layers of material more than about 0.5 and less than about 50 micrometers thick.

7. The article of claim 2 wherein the barrier resin is present in about 2 to 40 weight percent, the polyolefin is about 60 to 98 weight percent, and the compatibilizer is about 0.5 to 12 weight percent of the article.

8. The article of claim 1 wherein said article is in the shape of a film, container, tube, sheet or filament.

9. The article of claim 7 wherein the barrier resin is present in about 2 to 15 weight percent, the polyolefin is about 70 to 90 weight percent, and the compatibilizer is about 0.5 to 5 weight percent of the article.

10. The article of claim 1 wherein the condensation polymer is present in about 60 to 95 weight percent and the phenol-formaldehyde resin is about 5 to 40 weight percent of the barrier resin.

11. The article of claim 2 where in the compatibilizer is a graft polymer with a polyolefin backbone onto which anhydride moieties have been grafted.

12. The article of claim 3 wherein the polyamide is selected from polycaproamide and copolymers of adipic acid, hexamethylene diamine and caprolactam.

13. A laminated structure comprising at least one first layer of the laminar article of claim 1 and at least one second layer of a polyolefin.

14. The laminated structure of claim 13 wherein the polyolefin of the second layer is the same as the polyolefin in the first layer.

15. The laminated structure of claim 13 wherein the polyolefin is polyethylene.

16. The laminated structure of claim 13 in the form of a container.

17. The laminated structure of claim 16 wherein the container is a fuel tank for motor vehicles.

18. A multilayered laminate comprising at least three layers, wherein the first layer comprises a polyolefin, the second layer comprises a compatibilizer, and the third layer comprises a barrier resin comprising a blend of a condensation polymer incompatible with the polyolefin and a phenol-formaldehyde resin.

* * * * *